March 29, 1955 F. A. ZIHERL 2,705,171
FOG SPRAY APPLICATOR
Filed Aug. 26, 1952 4 Sheets-Sheet 1
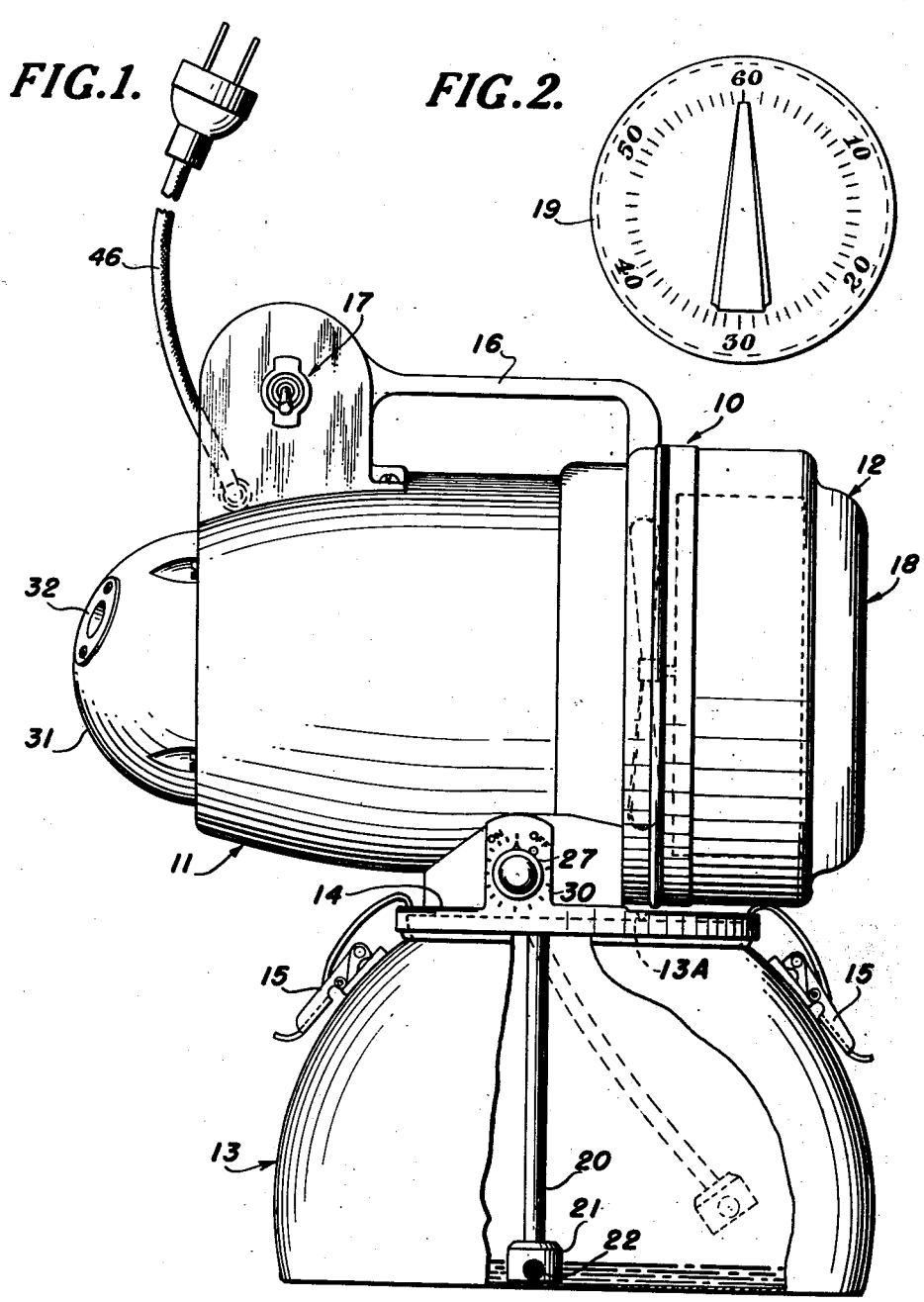
INVENTOR.
FRANK A. ZIHERL
BY
Cushman, Darby & Cushman
ATTORNEYS

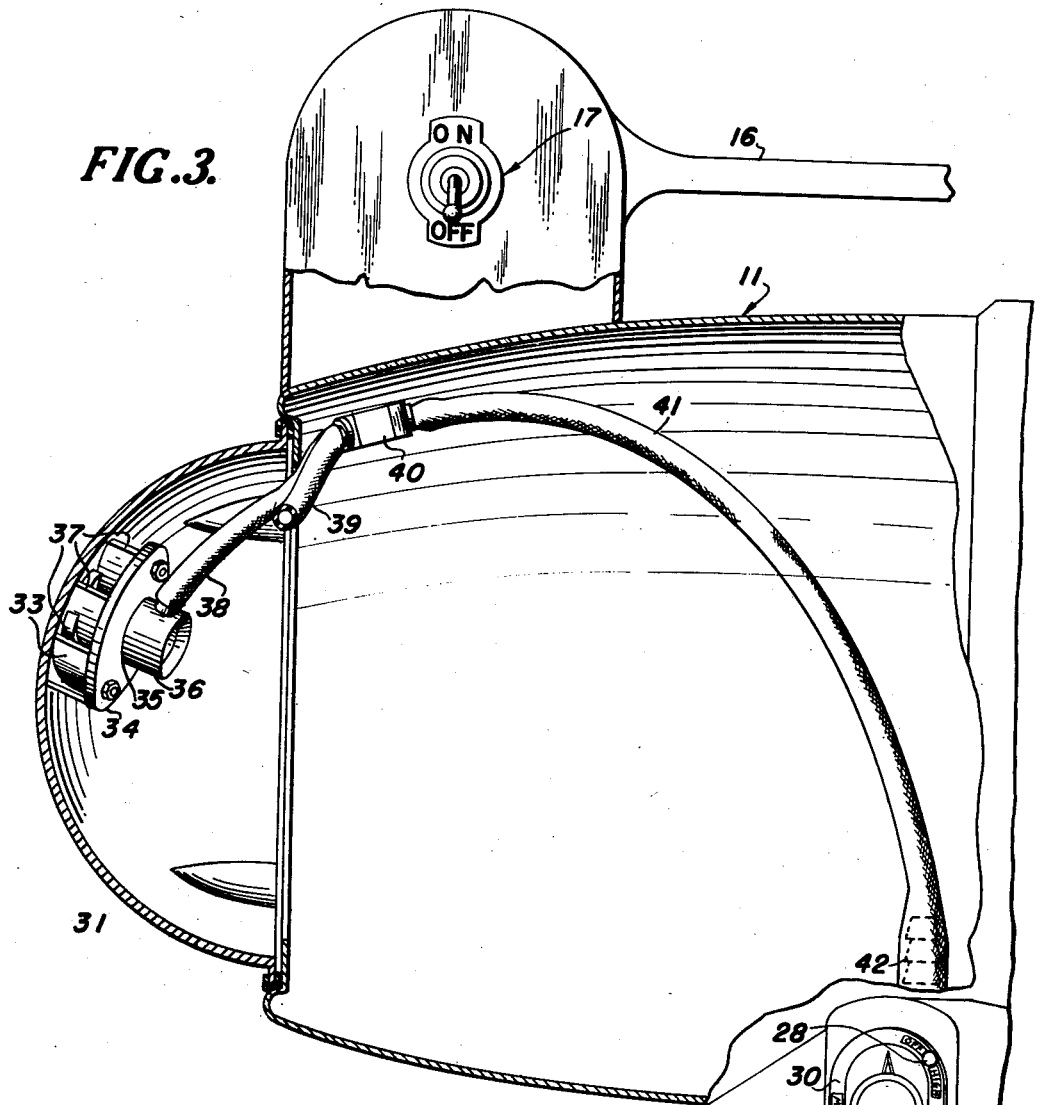
FIG. 3.
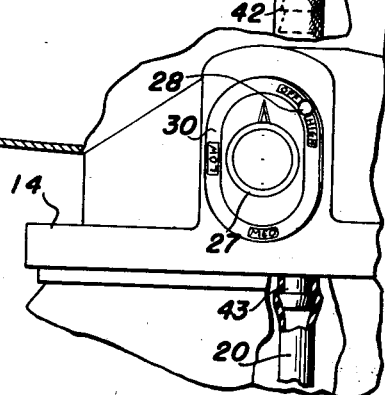
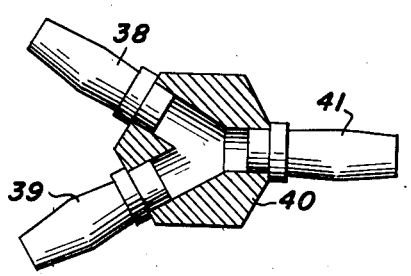
FIG. 4.
INVENTOR.
FRANK A. ZIHERL
BY Cushman, Darby & Cushman
ATTORNEYS March 29, 1955

F. A. ZIHERL 2,705,171

FOG SPRAY APPLICATOR

Filed Aug. 26, 1952

INVENTOR.
FRANK A. ZIHERL
BY
Cushman, Darby & Cushman

ATTORNEYS

March 29, 1955  F. A. ZIHERL  2,705,171
FOG SPRAY APPLICATOR
Filed Aug. 26, 1952  4 Sheets-Sheet 4

INVENTOR.
FRANK A. ZIHERL
BY
Cushman, Darby & Cushman
ATTORNEYS

United States Patent Office 2,705,171
Patented Mar. 29, 1955

2,705,171

FOG SPRAY APPLICATOR

Frank A. Ziherl, Mayfield, Ohio, assignor to Z & W Machine Products, Inc., Cleveland, Ohio, a corporation of Ohio Application August 26, 1952, Serial No. 306,331

8 Claims. (Cl. 299—86)

This invention relates to sprayers and more particularly to improvements in atomizers and fog spray dispensers such as used to dispense insecticides, deodorants, etc.

Heretofore, spraying machines, and especially portable aerosol dispensers, have been unsatisfactory for commercial spraying of large areas, such as poultry sheds, barns, warehouses, hospitals, institutions, factories, ships' holds, etc., or for continuous use requirements, such as the feeding of deodorants into air conditioning systems of theaters, auditoriums, office buildings, restaurants, etc.

Equipment presently available on the market is unreliable because of the use of revolving discs, pumps, or small orifices for air and liquid to pass through. On units employing the revolving or spinning disc principle, materials which dry or crystallize on the disc cause it to become unbalanced, which in turn creates a vibration and causes the disc to open up seals, resulting in leaks. In cases where a pump is used, the life of the pump has never been satisfactory. In units which employ small orifices, there is a marked tendency for materials to dry or crystallize at these orifices, thereby causing clogging and stoppages. Furthermore, most units now on the market have some type of mechanical or rubber pressure seal or gasket which is constantly being attacked and disintegrated by the chemicals dispensed by the sprayer. Thus, units having these weaknesses cannot be employed in extensive commercial service because the cost of maintaining, cleaning and replacing parts is prohibitive.

It is an object of my invention to provide a trouble-free sprayer having only one moving part.

Another object of my invention is to provide a spray applicator which is not dependent on pressure seals or gaskets.

It is another object of my invention to provide a spray applicator in which a vacuum is maintained at all sealed points during operation.

It is still another object of my invention to provide a fog spray applicator which can adjustably control the size of the liquid particles being atomized.

A further object of my invention is to provide a fog spray applicator which will dispense atomized liquid efficiently over greater distances and areas than hitherto possible with similar equipment.

A still further object of my invention is to provide a small, compact, efficient fog spray applicator capable of mass spraying of large areas.

It is a still further object of my invention to provide a light, portable fog spray applicator compact enough to be operated by one person, yet rugged and powerful enough for continuous commercial use.

A further important object of my invention is to provide an automatically controlled fog spray applicator which will not clog, and may be quickly and conveniently disassembled for refilling and maintenance purposes.

Other objects and advantages of my invention will be apparent during the course of the following description.

In the accompanying drawings, forming a part of this application, and in which like numerals are employed to designate like parts throughout the same:

Figure 1 is a side elevation of the fog spray applicator embodying my invention, sectioned to show the position of the flexible reservoir hose;

Figure 2 shows an automatic timer which may be used on my applicator;

Figure 3 is a partially sectioned elevation of the nose of my applicator showing one atomizer in perspective;

Figure 4 is an enlarged view of the Y-fitting connecting the atomizers to the reservoir hose;

Figure 5:
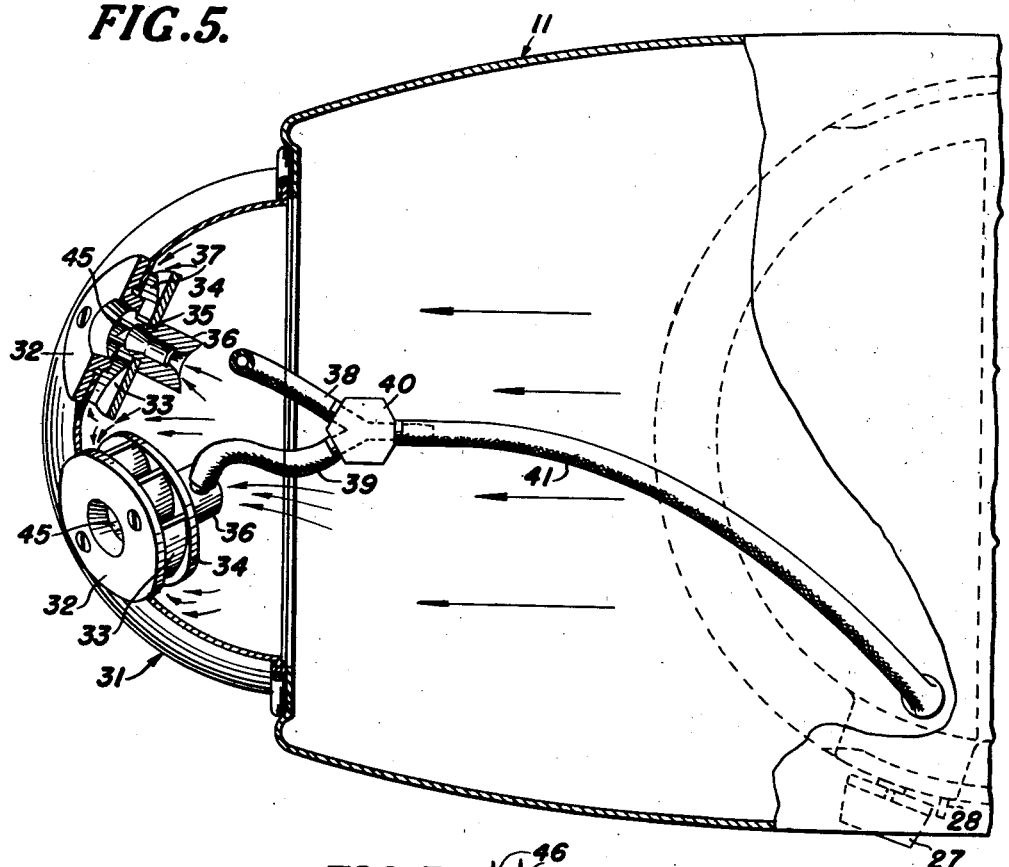
Figure 5 is a top partially sectioned view of the nose of my applicator, showing the atomizers in perspective.

In the drawings, wherein for the purpose of illustration is shown a preferred embodiment of my invention, the numeral 10 indicates my fog spray applicator, in which 11 designates the atomizer housing, 12 the electric fan and motor housing, and 13 the fluid reservoir detachably secured to base 14 by means of quick release toggle clamps 15. Toggle clamps 15, although shown in Figure 1 as being secured to the front and rear portions of reservoir 13, are actually mounted on the opposite side portions of reservoir 13. They have been revolved 90° in Figure 1 so as not to obscure the cutaway section showing hose 20, fluid inlet block 21, and inlet ports 22, and so as to better show the construction and quick release action of the clamps.

Adjacent to handle 16, provided to facilitate carrying of the applicator 10, is toggle switch 17 for turning on and off an electric motor-driven fan 18 contained in housing 12. It is to be noted that this motor-driven fan constitutes the only moving part in my fog spray applicator, and although an electric-driven fan is used in this preferred embodiment of my invention, it is to be understood that any equivalent means of inducing a forced draft in housing 11 is within the contemplation of this invention. In the preferred embodiment of my applicator, a ⅜ H. P. 1600 R. P. M. motor and fan assembly is used to create a vacuum sufficient to draw approximately 50 inches of water, or equivalent heads of other liquids, depending on their specific densities, since this applicator sprays both oil and water base liquids. In lieu of toggle switch 17, automatic timer 19 may be used to permit automatic spraying and shut-off at a predetermined time.

A flexible reservoir hose 20 is weighted on its free end by fluid inlet block 21, which is provided with screened inlet ports 22. Weighted hose 20 allows the applicator to be used in a tilted position varying up to 30° from the horizontal, since tilting within these limits will cause the inlet block 21, by force of gravity, to follow the movement of the liquid and stay immersed therein.

Figure 6:
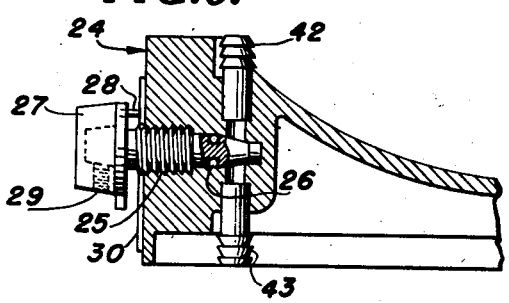
Figure 6 is a sectioned side elevation of the fluid flow control valve.

Fluid flow control valve 23, better shown in Figure 6, is used to regulate the flow of liquid from the reservoir to the atomizers, as is more fully described below. This valve comprises valve body 24, threaded valve stem 25, O ring seal 26, valve control knob 27, stop pin 28 and set screw 29. O ring seal 26 moves horizontally with stem 25 as it is unscrewed, and since this seal is in compression while the applicator is in operation, it will not permit air or liquid to leak by. Valve control knob 27 can be turned only one revolution before it comes into contact with stop pin 28, thereby keeping the threads of valve stem 25 in engagement with valve body 24 until set screw 29 is loosened and knob 27 is removed. A double pitch thread permits valve 23 to be fully opened in slightly less than one revolution. Dial 30 under knob 27 is graduated to provide information concerning the rate of flow of the applicator. Valve 23, in addition to regulating the flow of liquid from the reservoir, also governs the mass median micron size of the atomized liquid particles. With the rate of air flow remaining constant, this micron breakup size is smallest when the valve is in the minimum open position, and the size of these particles increases as the valve is opened further, until the valve is fully opened, whereupon the largest mass median micron size particle is being dispensed.

Hemispherically shaped nose 31 carries multiple nozzles 32, mounted on the outside of this nose. Behind each nozzle on the interior of hemispherically shaped nose 31 is mounted a whirler 33, comprising a base plate 34 having a center hole 35 concentric with and surrounding venturi tube 36. Mounted on base plate 34 is a circular series of curved blades 37, coaxial with venturi 36 and normal to base plate 34. Hoses 38 and 39 connect venturi 36 to Y-fitting 40, which in turn is connected to hose 41. The lower end of hose 41 is secured to upper hose fitting 42 of valve body 24, and the upper end of flexible reservoir hose 20 is secured to lower hose fitting 43 of valve body 24.

Figure 4 shows an enlarged top view of the connection of hoses 38, 39 and 41 with Y-fitting 40.

Figure 5 shows in perspective multiple atomizers, indicated generally by 45, as they are mounted in hemispherical nose 31. One atomizer is sectioned to show the relationship of nozzle 32, whirler 33 and venturi 36. This sectional view also shows the entrance of forced gas into venturi tube 36, as indicated by the arrows at the entrance to this section of the venturi tube. Arrows directed to the outer periphery of whirler 33 indicate the path of forced gas into whirler 33, which subsequently mixes with the gas passing through venturi tube 36, causing a whirling motion of the gas as it leaves flared nozzles 32. Hose 39 is shown connected to one venturi, indicating the manner in which fluid is admitted into the venturi tube and mixed with gases being forced through the venturi tube.

Figure 7:
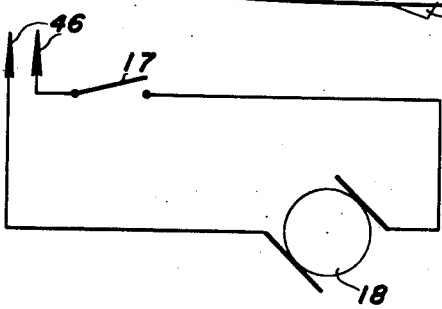
Figure 7 shows the electric motor wiring diagram.

Toggle switch 17 is represented diagrammatically in Figure 7, which schematically shows the wiring diagram of electric motor-driven fan 18, connected to a power plug 46.

Figure 8:
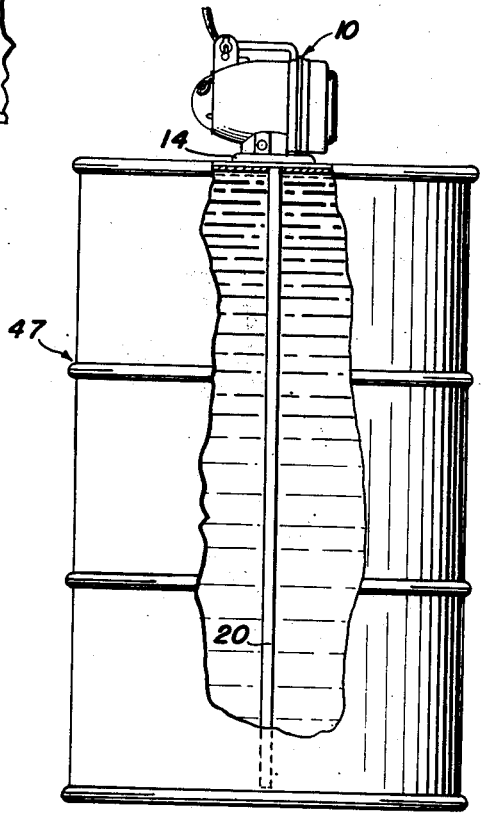
Figure 8 shows how my applicator may be adapted for use on a larger reservoir.

If the fog spray applicator 10 is to be attached to a larger reservoir 47, such as the fifty-gallon drum shown in Figure 8, then reservoir 13 is removed by the lifting of toggle clamps 15, whereby flexible hose 20 is lowered into this larger reservoir 47 and base 14 is placed in direct contact with the top of this reservoir and suitably secured thereto. This is an alternate use for my spray applicator, when it is not necessary or desirable to use the applicator in its portable form. An example of such use would be the continuous spraying of a deodorant into an air-conditioning system of a large hotel, theater, auditorium or hospital.

Figure 9:
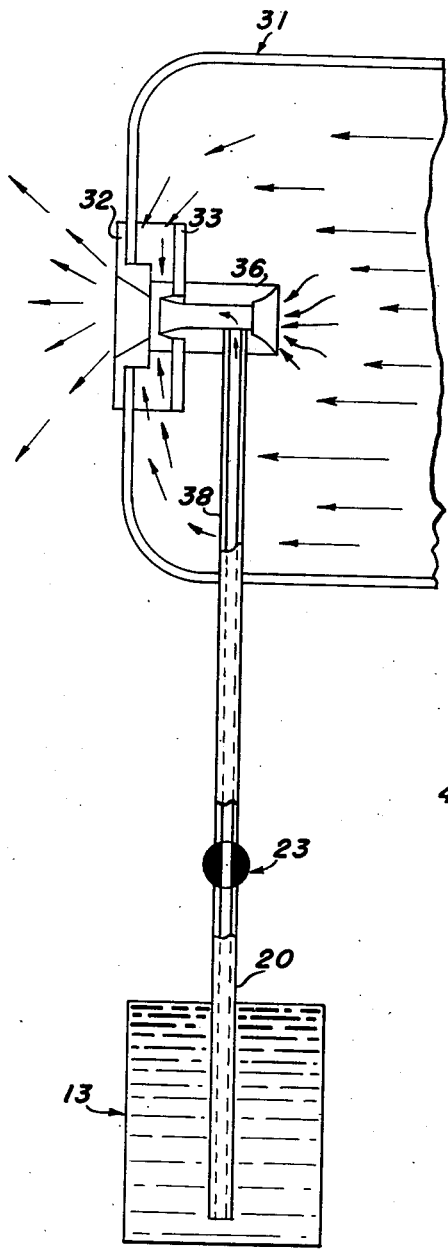
Figure 9 is a diagrammatic sectioned elevation of my applicator.

The operation of my spray applicator, as schematically shown in Figure 9, is as follows:

A forced draft of gas creating a pressure of approximately 2 p. s. i. is set up in housing 11 by any suitable means, such as an electric motor-driven fan 18 (not shown in Figure 9). A portion of this draft passes through venturi tube 36 over the top of hose 38, creating vacuum in this hose, according to the well understood venturi principle. If valve 23 then be opened, the force of atmospheric pressure, admitted through vent hole 13a, on the surface of the fluid in reservoir 13, in combination with the low pressure area in hose 20, the free end of which is in the reservoir, will force fluid up hoses 20 and 38 into venturi tube 36, where it is mixed with the gas passing through the venturi tube.

It can readily be appreciated that when the applicator is being operated, no leaking can occur at valve 23, or between reservoir 13 and base 14, due to the partial vacuum existing within the applicator, and the greater atmospheric pressure encompassing the exterior of the applicator.

In addition to this forced draft passing through venturi tube 36, another portion of the gas is forced into whirlers 33, which by virtue of their circular series of curved blades coaxial with venturi tube 36, impart a whirling motion to this body of gas passing through the whirlers 33, and upon reaching the outlet end of venturi tube 36, transmit this same whirling motion to the mixture of gas and liquid leaving the venturi tube. The gas passing through venturi tube 36 mixes with liquid drawn from reservoir 13, partially atomizing this liquid to the extent that the usual atomizer accomplishes such atomization. However, when this partially atomized mixture reaches whirlers 33, this intense whirling motion which is imparted to the fluid-gas mixture renders a much more complete breakdown of the fluid particles, so that when they are dispersed through flared nozzles 32, they permeate throughout the adjoining atmosphere to a degree beyond that obtained in the usual commercial fog spray applicator.

The location of multiple atomizers 45 in the upper portion of the hemispherically shaped nose 31, and the nozzles 32 of these atomizers being directed away from each other, results in obtaining a very efficient dispersion of atomized particles as they leave the applicator. Although only two atomizers have been shown in this embodiment of my invention, any number may be used, depending on the requirements of the user and the corresponding capacity of the motor-fan unit.

By appropriate regulation of valve 23, my fog spray applicator can dispense from a minimum of a few ounces of liquid per hour with the valve in the near closed position, to approximately four to five gallons of liquid per hour, with the valve in the full open position.

It is to be understood that the form of my invention herewith shown and described is to be taken as a preferred example of the same, and that various changes in the shape, size and arrangement of parts may be resorted to, without departing from the spirit of my invention or the scope of the subjoined claims.

I claim:

1. An atomizer comprising: a venturi tube; means for forcing gas through said tube; means for admitting fluid through the side of said tube to mix with the gas forced through said tube; means for whirling gas in a plane normal to and in contact with the stream of the fluid-gas mixture leaving said tube, said tube and said gas whirling means being adjacent and concentric; an outlet discharge nozzle; and means for directing the discharge of said fluid-gas mixture from said whirling means into said discharge nozzle.

2. The apparatus of claim 1 wherein said gas whirling means comprises: a base plate having a center hole concentric with and surrounding said venturi tube; and a circular series of curved blades coaxial with said venturi and normal to said base plate.

3. The apparatus of claim 1 wherein said gas whirling means comprises: a circular base plate having a center hole concentric with and surrounding said venturi tube; and a circular series of helically curved blades coaxial with the venturi and normal to said base plate.

4. The apparatus of claim 1 wherein said gas whirling means comprises: two side walls spaced apart, said side walls each having a center hole concentric with said venturi tube; and a circular series of curved blades coaxial with the venturi and normal to said side walls and secured thereto.

5. In a fog spray applicator including an air tunnel housing, a discharge nozzle having a passage therethrough, a venturi tube in said tunnel axially aligned with the passage through said nozzle, the passage through said nozzle being of substantially greater diameter than the diameter of said venturi tube, and means for feeding fluid into said venturi tube, the improvement for obtaining a superfine liquid particle breakup comprising impeller means for forcing a first stream of air at a high rate of speed through said venturi tube to draw liquid from said fluid feeding means into said venturi tube and to atomize partially said liquid therein, and means for whirling and greatly accelerating a series of secondary streams of air intermediate said venturi tube and said discharge nozzle in a plane normal to and in contact with the atomized liquid leaving said venturi tube, whereby said atomized liquid is further broken down into a fog-like density and is forced through said discharge nozzle at a high rate of speed.

6. The improvement in fog spray applicators set forth in claim 5, wherein said means for accelerating said series of secondary streams of air comprises a circular series of curved blades intermediate said venturi tube and said discharge nozzle adapted to direct streams of air between said blades inwardly for tangential contact with said first stream of air.

7. A fog spray applicator comprising a housing, an atomizer secured to the forward portion of said housing, an impeller secured to the rear portion of said housing for forcing air of ambient temperature therethrough, means for admitting fluid into said atomizer and non-constricted means of discharging the resulting mixture of fluid and air from said housing, said atomizer including a venturi tube, a liquid supply tube adapted to feed liquid into said venturi tube, and whirling means secured to the forward end of said venturi tube between said tube and the forward portion of said housing comprising a base plate rigidly secured to said venturi tube and having a center hole concentric with and surrounding the forward end of said venturi tube, and a circular series of curved blades coaxial with said venturi tube, normal to said base plate and integrally secured thereto, whereby said impeller forces a first air stream through said venturi tube to siphon liquid from said liquid supply tube and a second air stream through said whirling means, said first and second air streams intermixing at the forward end for said venturi tube to effect a superfine breakup of liquid particles prior to leaving said housing through said non-constricted discharging means.

8. The fog spray applicator set forth in claim 7 wherein said housing is portable and adapted for toggle clamp quick release attachment to a fluid reservoir.

References Cited in the file of this patent

UNITED STATES PATENTS

| | | |
|---|---|---|
| 1,474,603 | Morse | Nov. 20, 1923 |
| 1,629,288 | Morse | May 17, 1927 |
| 1,791,045 | Stevens | Feb. 3, 1931 |
| 1,800,476 | Schneider | Apr. 14, 1931 |
| 1,839,527 | Bates | Jan. 5, 1932 |
| 2,531,650 | Stagner | Nov. 28, 1950 |
| 2,547,084 | Marcuse | Apr. 3, 1951 |
| 2,609,233 | Stearman | Sept. 2, 1952 |
| 2,611,992 | Loy et al. | Sept. 30, 1952 |